(12) United States Patent
Seo et al.

(10) Patent No.: US 8,302,424 B2
(45) Date of Patent: Nov. 6, 2012

(54) REFRIGERATOR

(75) Inventors: Chang Ho Seo, Seoul (KR); Dong Jeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 598 days.

(21) Appl. No.: 12/491,628

(22) Filed: Jun. 25, 2009

(65) Prior Publication Data

US 2010/0126201 A1    May 27, 2010

(30) Foreign Application Priority Data

Nov. 24, 2008  (KR) .................. 10-2008-0117131

(51) Int. Cl.
*F25C 1/22*  (2006.01)

(52) U.S. Cl. .......................... 62/340; 62/449

(58) Field of Classification Search .................... 62/340, 62/407, 419, 449, 455, 353, 441, 515, 179, 62/198, 344, 420; 222/146.6, 146.1
See application file for complete search history.

(56) References Cited

U.S. PATENT DOCUMENTS

| | | | |
|---|---|---|---|
| 6,945,068 B2 * | 9/2005 | Kim et al. .................. | 62/353 |
| 7,228,703 B2 * | 6/2007 | Kim et al. .................. | 62/353 |
| 7,240,510 B2 * | 7/2007 | Lee et al. ................... | 62/353 |
| 7,337,620 B2 * | 3/2008 | Coulter et al. ............. | 62/137 |
| 2005/0160756 A1 * | 7/2005 | Lee et al. ................... | 62/340 |
| 2005/0210909 A1 * | 9/2005 | Kim et al. .................. | 62/340 |
| 2006/0096310 A1 * | 5/2006 | Lee ............................ | 62/348 |
| 2006/0196214 A1 * | 9/2006 | Lee et al. ................... | 62/344 |
| 2007/0209382 A1 * | 9/2007 | Kim et al. .................. | 62/340 |
| 2008/0127670 A1 * | 6/2008 | Tikhonov et al. ........... | 62/455 |
| 2008/0148745 A1 * | 6/2008 | Zhang et al. ............... | 62/113 |
| 2008/0148761 A1 * | 6/2008 | Venkatakrishnan et al. | 62/340 |

FOREIGN PATENT DOCUMENTS

| | | |
|---|---|---|
| KR | 10-2002-0009436 | 2/2002 |
| KR | 10-0584271 | 5/2006 |
| KR | 10-2008-003654 | 1/2008 |

OTHER PUBLICATIONS

Translation of KR 1020080003654 to Dong-Hun Lee.*
International Search Report issued in PCT/KR2009/003240 dated Feb. 5, 2010.

* cited by examiner

*Primary Examiner* — Mohammad Ali
(74) *Attorney, Agent, or Firm* — KED & Associates, LLP

(57) ABSTRACT

A refrigerator is provided. The refrigerator may include an evaporator that generates cold air supplied to a refrigerating chamber and a freezing chamber, a first fan that supplies the cold air generated by the evaporator to a refrigerating chamber and a freezing chamber of the refrigerator, and a second fan that circulates the cold air within the refrigerating chamber.

11 Claims, 6 Drawing Sheets

REFRIGERATOR

CROSS-REFERENCE TO RELATED APPLICATIONS

This application claims priority under 35 U.S.C. 119 and 35 U.S.C. 365 to Korean Patent Application No. 10-2008-0117131 (filed in Korea on Nov. 24, 2008), the entirety of which is incorporated herein by reference.

BACKGROUND

1. Field

A refrigerator is provided, and more particularly, a refrigerator having an ice making apparatus installed on an interior side of a refrigerating chamber door is provided.

2. Background

A refrigerator is a home appliance that preserves perishable items at appropriate temperatures. Refrigerators having a dispenser that allows items such as ice and/or water to be dispensed without opening a refrigerating or freezing chamber door are widely used. Such a refrigerator may include an ice making apparatus that makes and dispenses ice.

BRIEF DESCRIPTION OF THE DRAWINGS

The embodiments will be described in detail with reference to the following drawings in which like reference numerals refer to like elements wherein.

DETAILED DESCRIPTION

Figure 1:
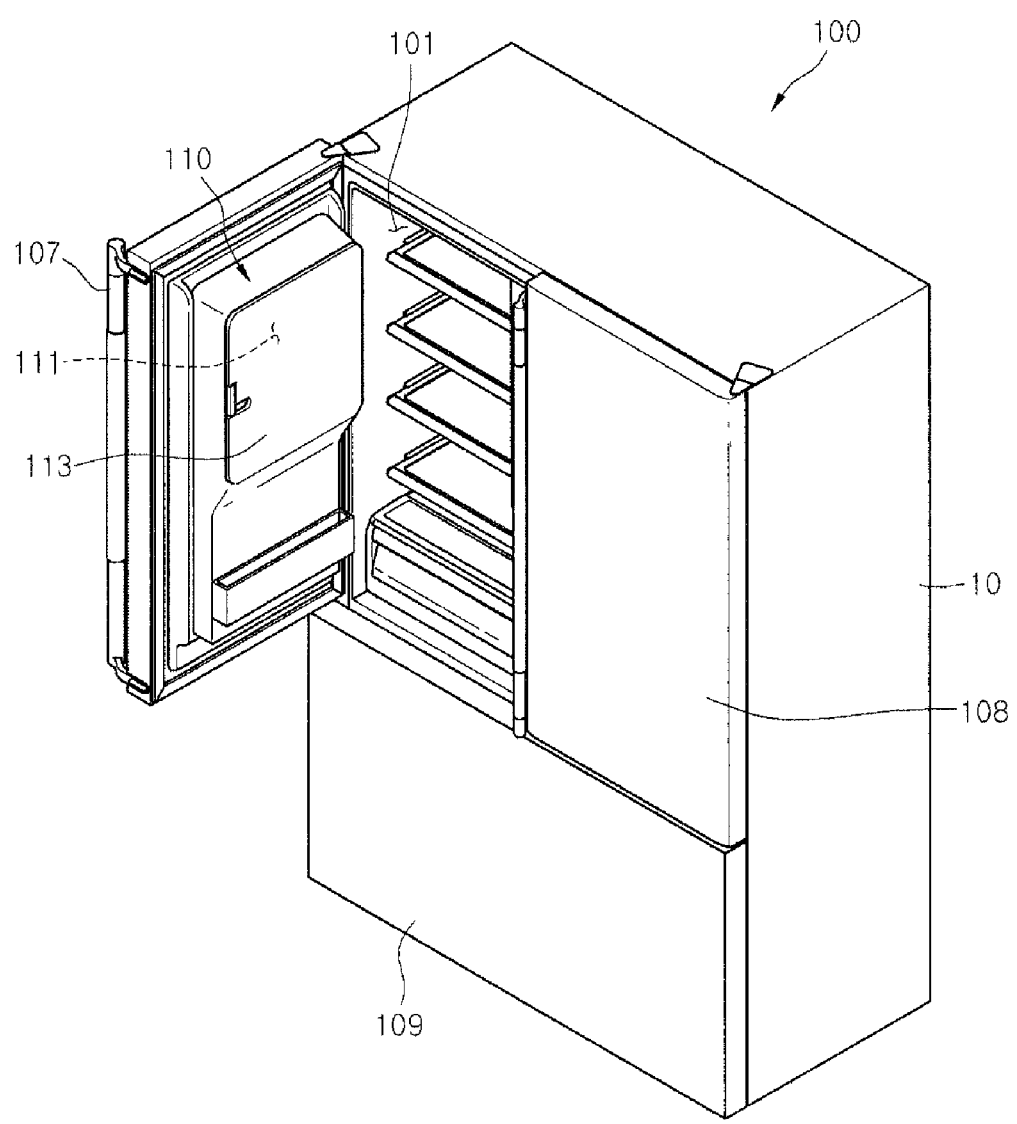
FIG. 1 is a perspective view of an exemplary refrigerator in accordance with an embodiment as broadly described herein.
Figure 2:
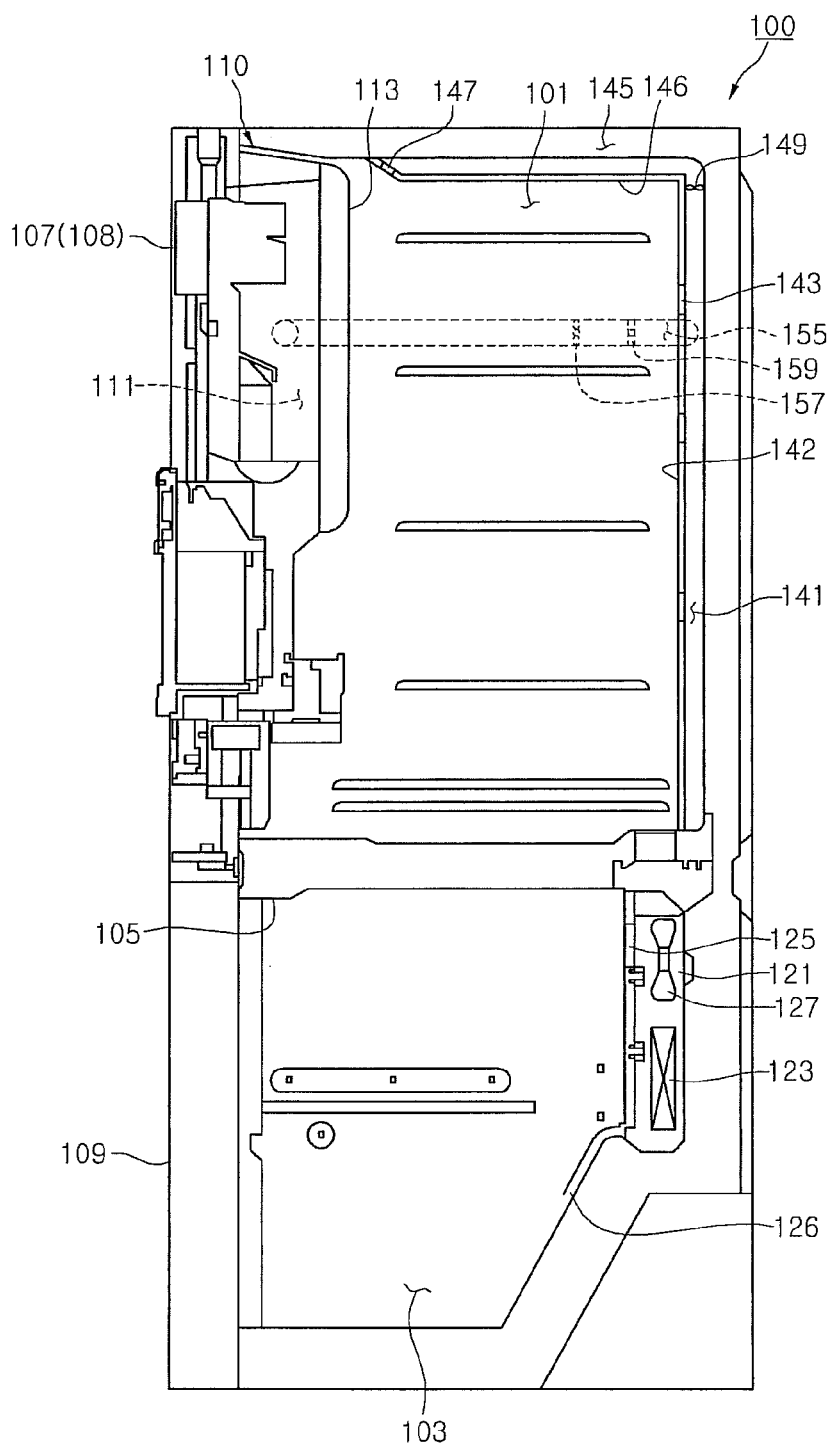
FIG. 2 is a vertical cross-sectional view of the refrigerator shown in FIG. 1.

The exemplary refrigerator 100 shown in FIGS. 1 and 2 may include a refrigerating chamber 101 and a freezing chamber 103 provided in the inside of a cabinet 10. The refrigerating chamber 101 and the freezing chamber 103 may provide storage space in which refrigerated or frozen foods may be stored. In the embodiment shown in FIGS. 1-2, the refrigerating chamber 101 is positioned on top of the freezing chamber 103, partitioned by a barrier 105 provided in the inside of the cabinet 10. Other arrangements of the refrigerating and freezing chambers 101 and 103 may also be appropriate.

The refrigerating chamber 101 and the freezing chamber 103 may be selectively opened and closed by two refrigerating chamber doors 107 and 108 and one freezing chamber door 109, respectively. In the embodiment shown in FIG. 1, opposite ends of the refrigerating chamber doors 107 and 108 are rotatably coupled to the cabinet 10 to open and close the refrigerating chamber 101, and the freezing chamber door 109 has a drawer type structure that opens and closes the freezing chamber 103.

An ice making housing 110 may be provided on an interior side of one of the refrigerating chamber doors 107 and 108 (hereinafter, referred to as "door", simply for convenience). An ice making room 111 may be provided within the ice making housing 110. The ice making room 111 may be selectively opened and closed by an ice making cover 113 coupled to an open face of the ice making housing 110 so as to partition the ice making room 111 from the refrigerating chamber 101.

An ice making apparatus (not shown) may be installed in the ice making room 111. The ice making apparatus may include an ice maker that produces ice and an ice bin in which the ice produced by the ice maker is stored.

A heat-exchange chamber 121 may be provided for example, to the rear end of the freezing chamber 103. An evaporator 123 may be installed in the heat-exchange chamber 121. The evaporator 123 generates cold air by performing a heat-exchange between cold air circulating through a refrigeration cycle and air inside the freezing chamber 103.

A blowing fan 127 may be installed in the heat-exchange chamber 121. The blowing fan 127 may blow cold air generated by the evaporator 123 into the inside of the freezing chamber 103, the refrigerating chamber 101 and the ice making room 111.

A cold air outlet 125 and a cold air return hole 126 may be provided with the heat-exchange chamber 121. The cold air outlet 125 allows cold air generated by the evaporator 123 to be supplied to the inside of the freezing chamber 103. The cold air return hole 126 allows cold air circulating in the freezing chamber 103 to be returned to the inside of the heat-exchange chamber 121.

In the inside of the cabinet 10, a cold air supply flow passage 141 and a cold air return flow passage (not shown) may be provided to allow cold air generated by the evaporator 123 to also flow to the refrigerating chamber 101 by driving the blowing fan 127.

More specifically, the cold air supply flow passage 141 may extend along the rear surface of the refrigerating chamber 101. The lower end of the cold air supply flow passage 141 may communicate with the heat-exchange chamber 121. The cold air supply flow passage 141 may be formed substantially between the rear surface of the refrigerating chamber 101 and a cold air duct 142 installed on the rear interior surface of the refrigerating chamber 101. One or more cold air outlets 143 that discharge cold air flowing through the cold air supply flow passage 141 into the refrigerating chamber 101 may be provided on a front surface of the cold air duct 142. The cold air return flow passage (not shown) returns air from the refrigerating chamber 101 to the inside of the heat-exchange chamber 121. Opposite ends of such a cold air return flow passage may communicate with the refrigerating chamber 101 and the heat-exchange chamber 121, respectively.

An auxiliary cold air supply flow passage 145 may be provided at an upper surface of the refrigerating chamber 101. An inlet end of the auxiliary cold air supply flow passage 145 may communicate with the upper, outlet, end of the cold air supply flow passage 141. The auxiliary cold air supply flow passage 145 may be formed adjacent to the ceiling surface of the refrigerating chamber 101 so as to define an auxiliary cold air duct 146.

An auxiliary cold air outlet 147 may be provided at a front end of the auxiliary cold air supply flow passage 145. The auxiliary cold air outlet 147 discharges cold air onto an outer surface of the ice making housing 110, and more specifically, onto the ice making cover 113. To this end, a portion of the front end of the auxiliary cold air supply flow passage 145 may be tilted upward and forward, and the auxiliary cold air outlet 147 may be formed as an opening in the front portion of the auxiliary cold air duct 146.

An auxiliary blowing fan 149 may be installed in the inside of the cold air supply flow passage 141 to guide cold air from the cold air supply flow passage 141 to the auxiliary cold air supply flow passage 145 and discharge the cold air onto the ice making housing 110 through the auxiliary cold air outlet 147. In the embodiment shown in FIG. 2, the auxiliary blowing fan 149 is installed at an upper part of the cold air supply flow passage 141, adjacent to the inlet end of the auxiliary cold air supply flow passage 145. In certain embodiments, the auxiliary blowing fan 149 may be driven only during the operation of the ice making apparatus, so that cold air is not discharged onto the ice making housing 110 when the ice making apparatus is not operating. Therefore, since a temperature difference between the inside of the refrigerating chamber 101 and the inside of the ice making room 111 may be relatively reduced, the dewing phenomenon, or accumulation of condensation, on the surface of the ice making housing 110 may also be reduced so that the discharge of cold air by the auxiliary blowing fan 149 is not required.

A flow passage 155 and a blowing fan 157 that circulate a portion of the cold air generated from the evaporator 123 into an interior of the ice making room 111 may also be provided. Furthermore, a damper 159 that selectively opens and closes the flow passage 155 that supplies cold air to the ice making room 111 may be provided. Such a flow passage 155 and a blowing fan 157 may be selectively opened and closed and driven based on whether or not the ice making apparatus is operated. In other words, the damper 159 may open the flow passage 155 and the blowing fan 157 may be driven only when the ice making apparatus is operated so that the portion of the cold air generated by the evaporator 123 may be circulated to the ice making room 111.

Hereinafter, the operation of this embodiment will be described in more detail with reference to the drawings.

Figure 3:
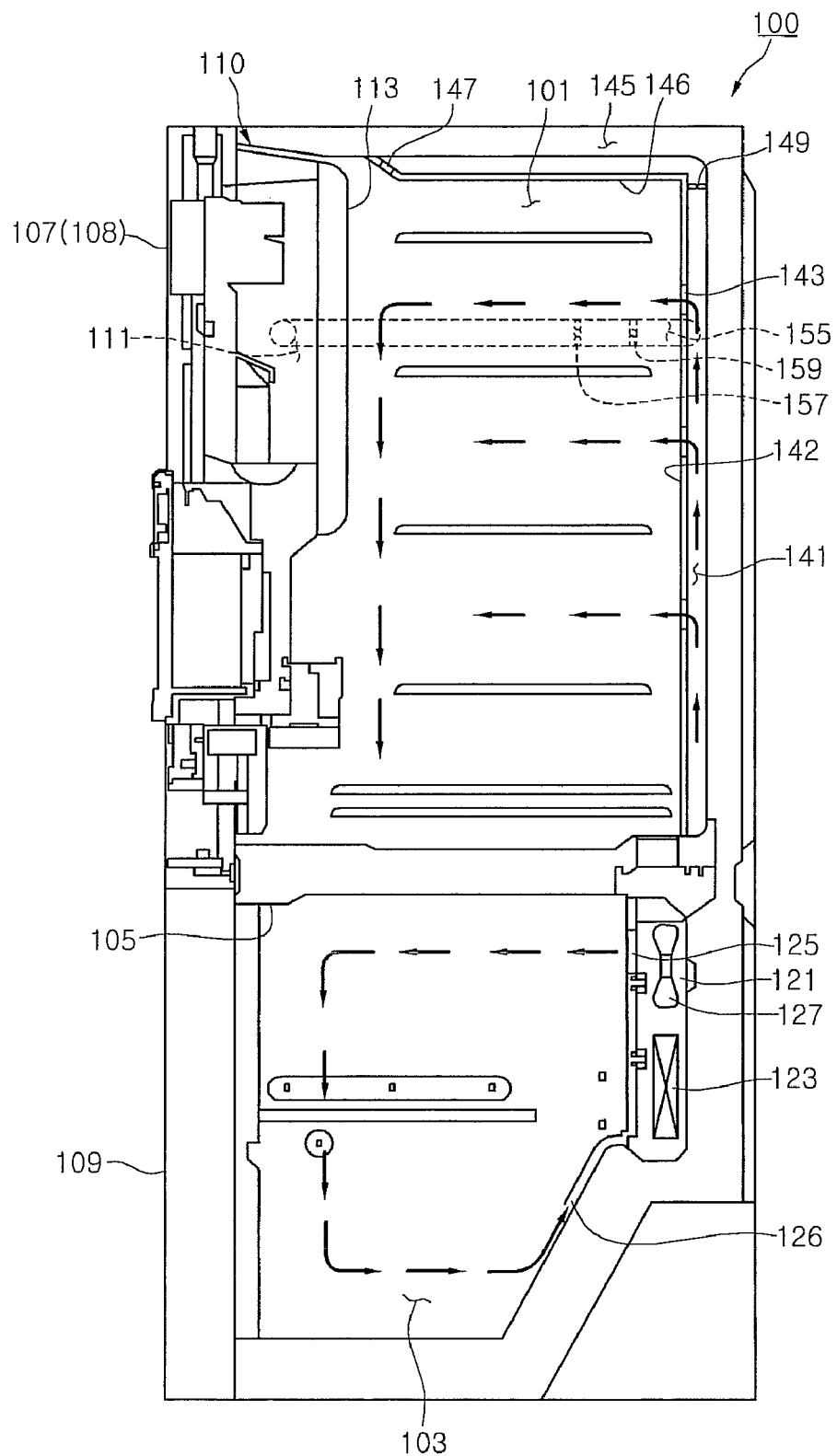
FIGS. 3 and 4 illustrate the flow of cold air in the refrigerator shown in FIG. 1.

As shown in FIG. 3, if the refrigerator is operated in a state in which the ice making apparatus is stopped, the cold air generated by the evaporator 123 as the blowing fan 127 is driven is supplied to the inside of the freezing chamber 103 from the inside of the heat-exchange chamber 121 through the cold air outlet 125 of the heat-exchange chamber 121. Due to the continuous driving of the blowing fan 127, cold air is circulated in the freezing chamber 103 and is returned to the inside of the heat-exchange chamber 121 through the cold air return hole 126.

Additionally, due to the driving of the blowing fan 127, a portion of the cold air generated by the evaporator 123 flows into the cold air supply flow passage 141 to be supplied to the inside of the refrigerating chamber 101 through the cold air outlet 143. And, due to the continuous driving of the blowing fan 127, the cold air supplied to the inside of the refrigerating chamber 101 circulates within the refrigerating chamber 101 and is returned to the inside of the heat-exchange chamber 121 through the cold air return flow passage.

However, in a state in which the ice making apparatus is stopped, cold air is not supplied the ice making room 111 and the auxiliary blowing fan 149 is stopped. Therefore, cold air is not discharged through the auxiliary cold air outlet 147 of the auxiliary cold air supply flow passage 145. If cold air is not supplied to the ice making room 111, the temperature difference between the refrigerating chamber 101 and the ice making room 111 is not great, and thus the dewing phenomenon, or accumulation of condensation, on the housing 110, is not such a problem.

Figure 4:
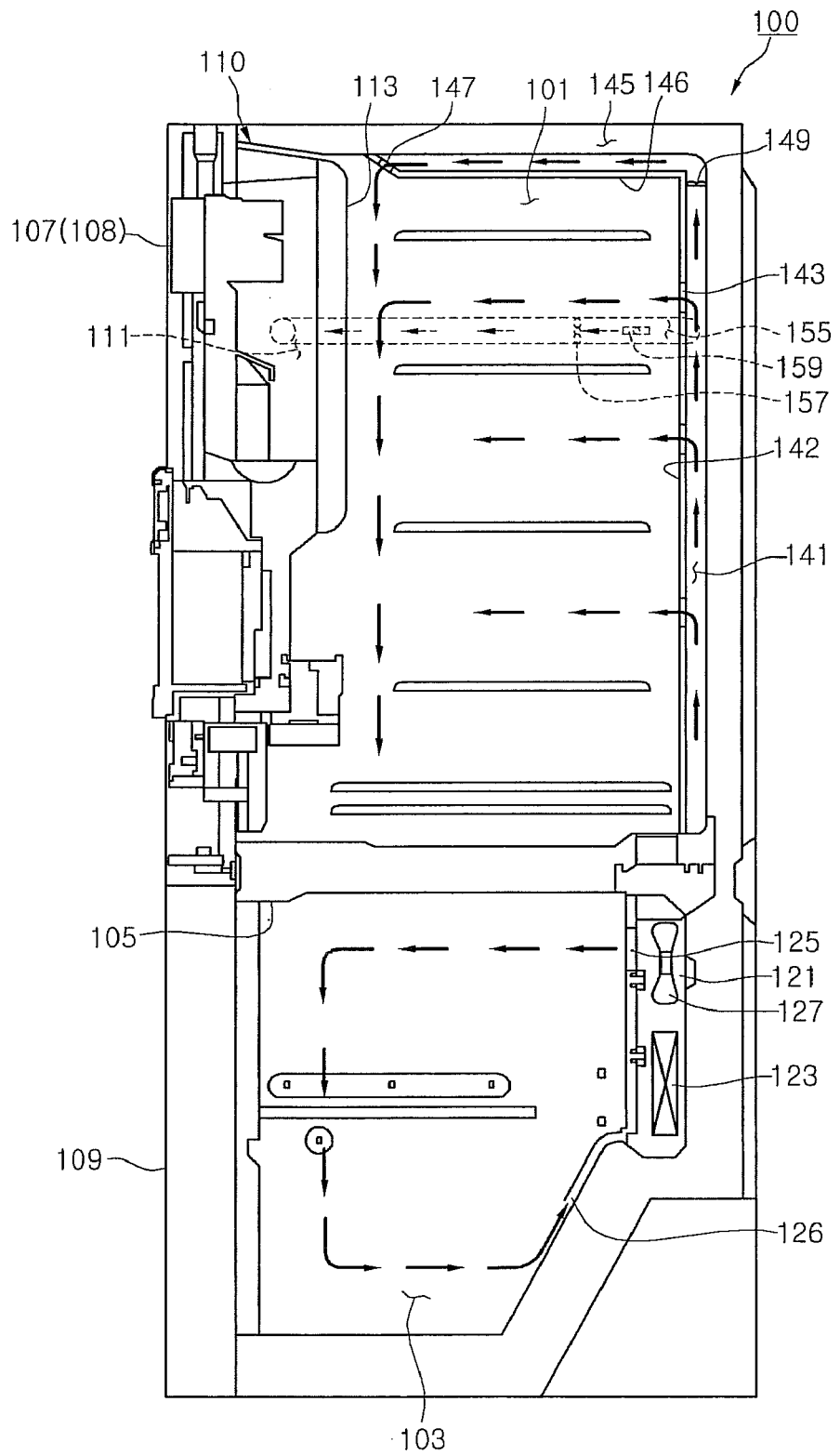

Meanwhile, referring to FIG. 4, if the ice making apparatus is operated, cold air is supplied to the ice making room 111 and the auxiliary blowing fan 149 is driven. Therefore, the circulation of the cold air between the heat-exchange chamber 121 and the ice making room 111, and the supply of the cold air to the surface of the ice making housing 110 through the auxiliary outlet 147 by means of the auxiliary blowing fan 149, are generated in addition to the supply and the circulation of cold air to the freezing chamber 103 and the refrigerating chamber 101 as described above.

More specifically, if the auxiliary blowing fan 149 is driven, the cold air flowing in the cold air supply flow passage 141 flows into the auxiliary cold air supply flow passage 145 and impinges on the surface of the ice making housing 110, and more specifically, onto the ice making cover 113, through the auxiliary cold air outlet 147. The cold air that flows onto the ice making cover 113 then flows to the cold air return flow passage together with the cold air that has circulated inside of the refrigerating chamber 101 to be returned to the inside of the heat-exchange chamber 121.

As described above, the cold air discharged by the auxiliary blowing fan 149 will have a relatively low temperature compared to the cold air circulating the inside of the refrigerating chamber 101. Therefore, the temperature difference between the inside of the ice making room 111 and one side of the refrigerating chamber 101 contacting the ice making room 111 may be relatively reduced, making it possible to prevent the dewing phenomenon, or accumulation of condensation, generated on the surface of the ice making housing 110, and in particular, on the surface of the ice making cover 113.

Also, the cold air discharged through the auxiliary cold air outlet 147 is directed toward the front of the refrigerating chamber 101. Therefore, although the refrigerating chamber 101 may be opened by the refrigerating chamber doors 107 and 108, the cold air discharged through the auxiliary cold air outlet 147 may function as a sort of air curtain, making it possible to reduce an amount of cold air from inside the refrigerator 101 that is leaked to the external.

Hereinafter, another embodiment will be described in more detail with reference to the accompanying drawings.

Figure 5:
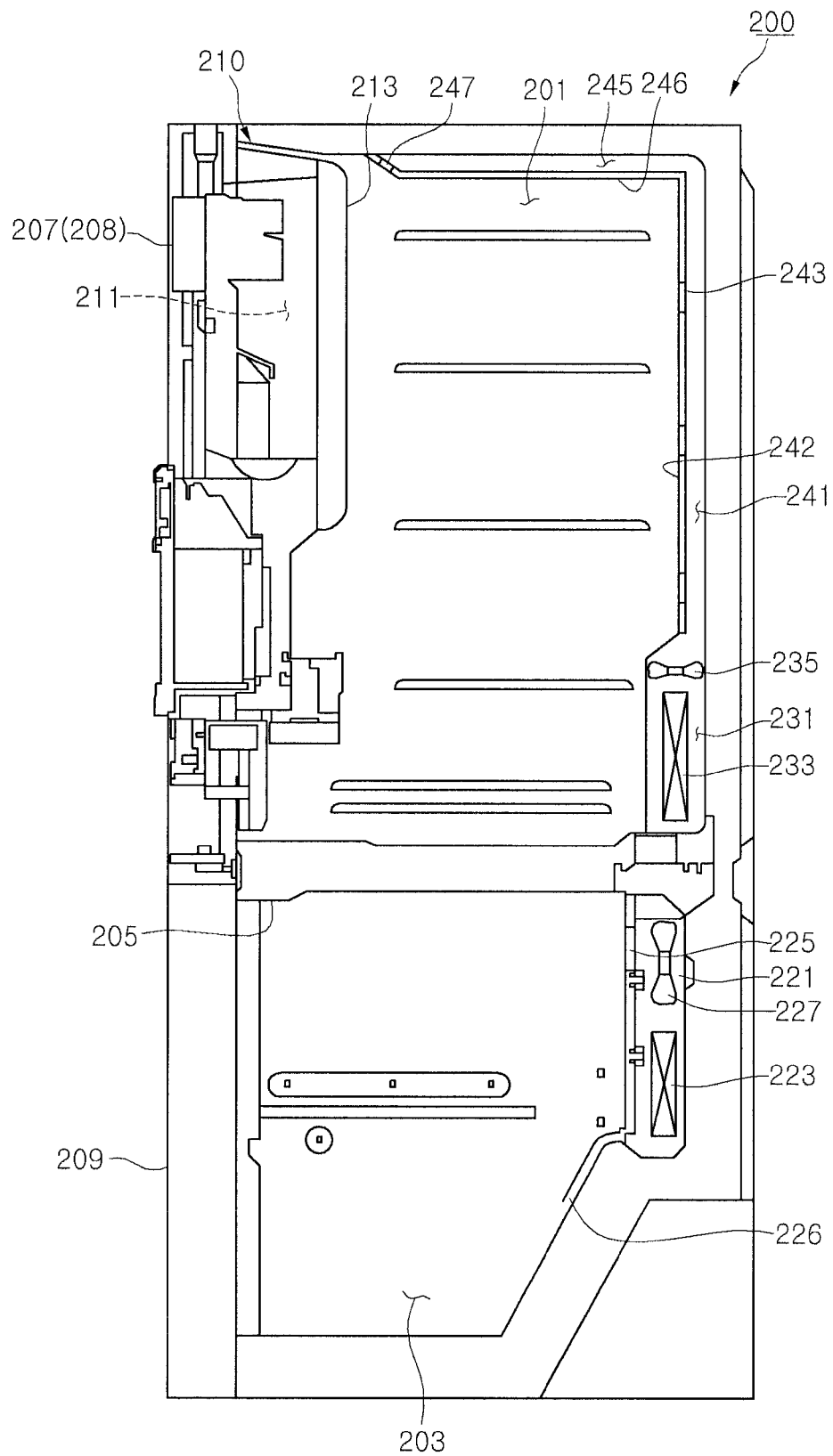
FIG. 5 is a vertical cross-sectional view of a refrigerator in accordance with another embodiment as broadly described herein.

Referring to FIG. 5, an additional heat-exchange chamber 231 may be provided at a rear of the refrigerator 200. And, an evaporator 233 and a blowing fan 235 may be installed in the additional heat-exchange chamber 231.

More specifically, a refrigerating chamber 201 and a freezing chamber 203 are provided in the inside of the refrigerator 200. The refrigerating chamber 201 and the freezing chamber 203 may be partitioned by a barrier 205. The refrigerating chamber 201 and the freezing chamber 203 may be selectively opened and closed by two refrigerating chamber doors 207 and 208 and one freezing chamber door 209, respectively.

An ice making housing 210 may be provided on an interior side of the refrigerating chamber doors 207 and 208 (hereinafter, referred to as door, for ease of explanation). An ice making room 211 may be provided in the inside of the ice making housing 110. The ice making room 211 may be selectively opened and closed by an ice making cover 213.

A first heat-exchange chamber 221 may be provided at a rear of the freezing chamber 203. A first evaporator 223 may be installed in the inside of the first heat-exchange chamber 221. A cold air outlet 225 and a cold air return hole 226 that circulate the cold air within the freezing chamber 203 may be provided in the heat-exchange chamber 221. Also, a first blowing fan 227 may be installed in the inside of the heat-exchange chamber 221 to supply cold air from the first evaporator 223 to each of the freezing chamber 203 and the ice making room 211, and to return the cold air circulated through the freezing chamber 203 and the ice making room 211 back to the first heat-exchange chamber 221.

The second heat-exchange chamber 231 may include a cold air return hole (not shown) that returns cold air from the refrigerating chamber 201, a second evaporator 233, and a second blowing fan 235. The second blowing fan 235 may supply cold air generated by the second evaporator 223 to the refrigerating chamber 201, and return cold air circulated within the refrigerating chamber 201 to the second heat-exchange chamber 231.

A first cold air supply flow passage 241 may be formed between the rear surface of the refrigerating chamber 201 and a first cold air duct 242 installed on the rear interior surface of the refrigerating chamber 201. The lower, inlet, end of the first cold air supply flow passage 241 may communicate with the second heat-exchange chamber 231. One or more first cold air outlets 243 that discharge cold air to the inside of the refrigerating chamber 201 may be provided on the front surface of the first cold air supply flow passage 241.

A second cold air supply flow passage 245 may provided at an upper surface of the refrigerating chamber 201, between the ceiling surface of the refrigerating chamber 201 and a second cold air duct 246. An inlet end of the second cold air supply flow passage 245 may communicate with an outlet end of the first cold air supply flow passage 241. A portion of the front end of the second cold air duct 246 may be tilted upward and forward. A second cold air outlet 247 may be provided on the front end of the second cold air duct 246.

Hereinafter, the operation of the embodiment shown in FIG. 5 will be described in more detail with reference to the drawings.

Figure 6:
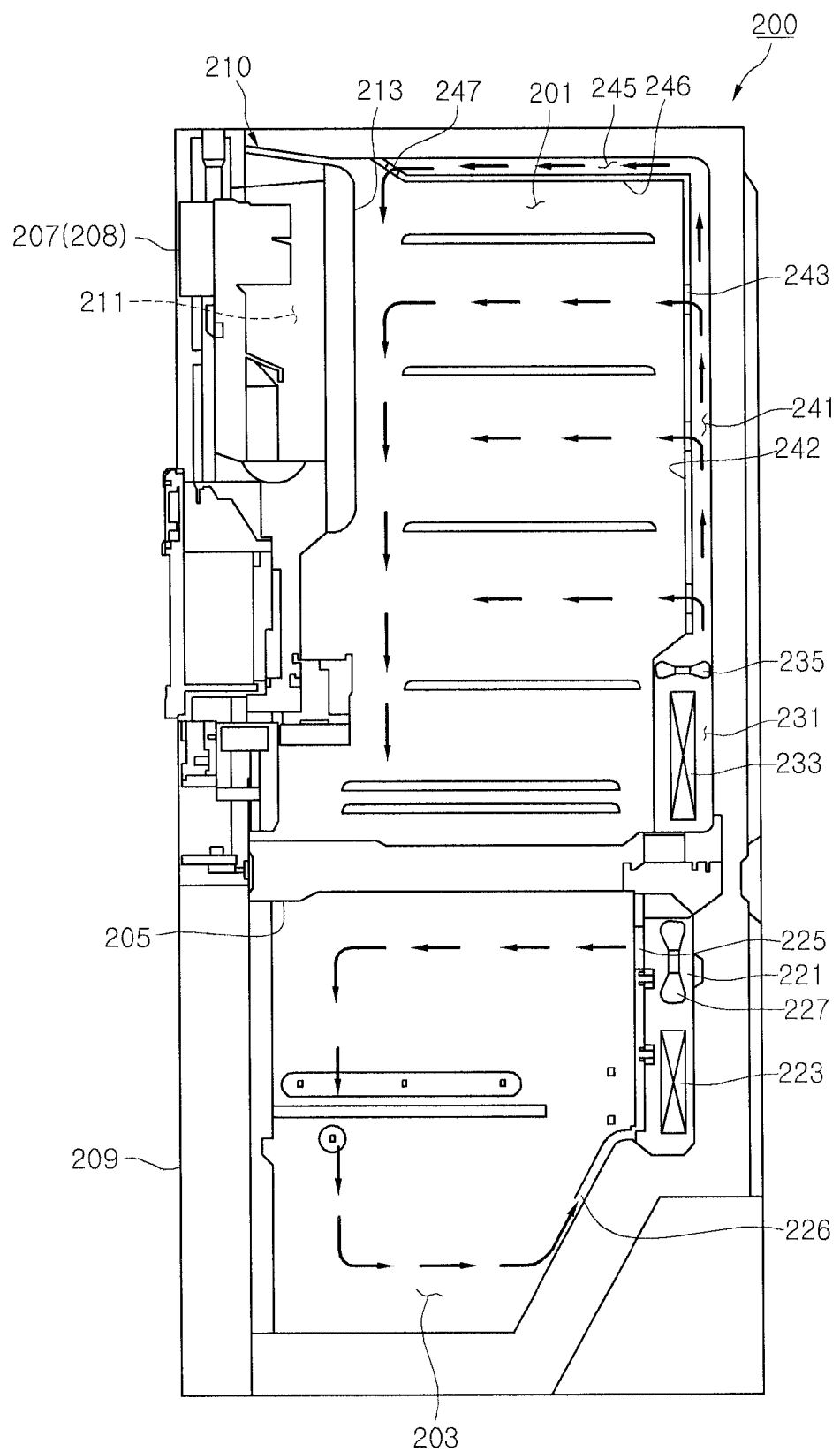
FIG. 6 illustrates the flow of cold air in the refrigerator shown in FIG. 5.

Referring to FIG. 6, if the refrigerator is operated, cold air generated by the evaporator 223 as the first blowing fan 227 is driven is supplied to the inside of the freezing chamber 203 from the inside of the first heat-exchange chamber 221 through the cold air outlet 225 of the first heat-exchange chamber 221. Due to the continuous driving of the first blowing fan 227, the cold air circulated the freezing chamber 203 is returned to the inside of the first heat-exchange chamber 221 through the cold air return hole 226.

A refrigerator operates, the second blowing fan 235 is driven. If the second bowing fan 235 is driven, the cold air generated by the second evaporator 233 is supplied to the inside of the refrigerating chamber 201 through the first cold air outlet 243 of the first cold air supply flow passage 241. And, due to the continuous driving of the second blowing fan 235, the cold air supplied to the inside of the refrigerating chamber 201 circulates within the refrigerating chamber 201 and is returned to the inside of the second heat-exchange chamber 231 through the cold air return hole of the second heat-exchange chamber 231.

Meanwhile, a portion of the cold air flowing in the cold air supply flow passage 241 flows into the second cold air supply flow passage 245 due to the driving of the second blowing fan 235 and is discharged to the inside of the refrigerating chamber 201, and more specifically, onto the surface of the ice making housing 210, through the second cold air outlet 247.

Although not shown, cold air may be selectively supplied to the ice making room 211 depending on whether or not the ice making apparatus is operated.

As described above, as cold air generated by the second evaporator 233 is discharged to the surface of the ice making housing 210 through the second cold air outlet 247 of the second cold air supply flow passage 245 by means of the second blowing fan 235, the temperature difference between the inside of the ice making room 211 and one side of the refrigerating chamber 201 contacting thereto is relatively reduced, making it possible to prevent dewing on the surface of the ice making housing 210. Also, the cold air discharged through the second cold air outlet 247 of the second cold air supply flow passage 245 functions as a sort of air curtain, making it possible to reduce leakage of cold air to outside of the refrigerator.

In the first embodiment, the auxiliary blowing fan 149 is described to be installed in the inside of the cold air supply flow passage. However, the auxiliary blowing fan may be installed in the inside of the auxiliary cold air supply flow passage 145 depending on the output thereof.

In the second embodiment, the second blowing fan 235 is described to be installed in the inside of the second heat-exchange chamber. However, the second blowing fan 235 may be installed in the inside of the first cold air supply flow passage 241 or in the inside of the second cold air supply flow passage 245.

In a refrigerator as embodied and broadly described herein, cold air flows to the ice making room installed on the interior side of the refrigerating chamber door that selectively opens and closes the refrigerating chamber. Therefore, dewing, or condensation, accumulated on the surface of the ice making room due to the temperature difference between the inside of the refrigerating chamber and the inside of the ice making room may be reduced.

Also, in a refrigerator as embodied and broadly described herein, the cold air circulates within the refrigerating chamber by means of a separate fan. Therefore, leakage of cold air to the outside as the refrigerating chamber door is opened and closed is reduced, making it possible to preserve foods stored in the inside of the refrigerator in a more fresh state.

A refrigerator is provided that can reduce a dewing phenomenon generated on the surface of an ice making room provided on a backside of a refrigerating chamber door.

A refrigerator is provided that can maintain the inner temperature of the refrigerator as a refrigerating chamber door is opened and closed.

In one embodiment, a refrigerator as broadly described herein may include an evaporator that generates cold air supplied to a refrigerating chamber and a freezing chamber; a first fan that supplies the cold air generated from the evaporator to the refrigerating chamber and the freezing chamber; and a second fan that circulates the cold air supplied to the refrigerating chamber by the first fan.

In another embodiment, a refrigerator as broadly described herein may include a refrigerating chamber and a freezing chamber in which foods are stored; refrigerating chamber doors and a freezing chamber door that selectively open and close the refrigerating chamber and the freezing chamber; an ice making room that is provided on the backside of the refrigerating chamber and has an ice making apparatus that produces ice therein; at least one evaporator that generates cold air supplied to the refrigerating chamber, the freezing chamber, and the ice making apparatus; a first fan that supplies the cold air generated from the evaporator to the refrigerating chamber, the freezing chamber, and the ice making apparatus; and a second fan that circulates the cold air supplied to the refrigerating chamber by the first fan to face the ice making room.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
a refrigerating chamber positioned above a freezing chamber;
at least one refrigerating chamber door and a freezing chamber door that selectively open and close the refrigerating chamber and the freezing chamber, respectively;
an ice making housing mounted on an interior side of the at least one refrigerating chamber door, the ice making housing deeming an ice making chamber having an ice making apparatus mounted therein; at least one evaporator generates cold air to be supplied to the refrigerating chamber, the freezing chamber, and the ice making chamber; a first fan supplies the cold air generated by the evaporator to the refrigerating chamber, the freezing chamber, and the ice making chamber; and
a second fan circulates the cold air supplied to the refrigerating chamber and directs the cold air toward the ice making housing.

2. The refrigerator of claim 1, further comprising a cold air flow passage that receives the cold air generated by the at least one evaporator, wherein the cold air flow passage comprises:
a first flow passage, the first flow passage extends vertically along a rear surface of the refrigerating chamber, the first flow passage having a lower end communicates with a heat exchange chamber and the at least one evaporator is installed in the heat exchange chamber; and
a second flow passage extends horizontally along a top surface of the refrigerating chamber, from a rear side to a forward side of the refrigerating chamber, wherein a rear end of the second flow passage communicates with an upper end of the first flow passage, and wherein a cold air outlet is provided at a front end of the second flow passage.

3. The refrigerator of claim 2, wherein the front end of the second flow passage is angled with respect to the top surface of the refrigerating chamber, and wherein the cold air outlet is configured to discharge cold air from the second flow passage at an angle with respect to the top surface of the refrigerating chamber.

4. The refrigerator of claim 2, wherein the cold air outlet is configured to discharge cold air from the second flow passage such that the discharged cold air impinges on an outer surface of the ice making housing.

5. The refrigerator of claim 2, wherein the cold air outlet is configured to discharge cold air form the second flow passage such that the discharged cold air flows along a front face of the refrigerating chamber.

6. The refrigerator of claim 2, wherein the second fan is installed within the cold air flow passage.

7. The refrigerator of claim 1, wherein the at least one evaporator comprises:
a first evaporator installed in a first heat exchange chamber provided in the freezing chamber; and
a second evaporator installed in a second heat exchange chamber provided in the refrigerating chamber.

8. The refrigerator of claim 1, wherein the ice making chamber is selectively opened and closed by an ice making cover rotatably coupled to the ice making housing.

9. The refrigerator of claim 8, wherein the ice making cover defines a portion of the interior side of the at least one refrigerating chamber door.

10. The refrigerator of claim 1, wherein the second fan is configured to operate only when cold air is supplied to the ice making chamber by the first fan.

11. The refrigerator of claim 1, wherein cold air is supplied to the ice making chamber by a flow generated by the first fan, and the second fan is driven only when the ice making apparatus is operated.

* * * * *